United States Patent [19]

Back et al.

[11] Patent Number: 5,229,502
[45] Date of Patent: Jul. 20, 1993

[54] PREPARATION OF 1:2 CHROMIUM COMPLEXES ONE SULFO SUBSTITUTED AND ONE SULFONAMIDO OR THE LIKE SUBSTITUTED AZO DYES

[75] Inventors: Gerhard Back, Lörrach, Fed. Rep. of Germany; Alois Püntener, Rheinfelden, Switzerland

[73] Assignee: Ciba-Geigy Corporation, Ardsley, N.Y.

[21] Appl. No.: 483,144

[22] Filed: Feb. 21, 1990

[30] Foreign Application Priority Data

Feb. 23, 1989 [CH] Switzerland .......................... 654/89

[51] Int. Cl.$^5$ .................. C09B 45/06; C09B 45/16
[52] U.S. Cl. .................. 534/602; 534/696; 534/699; 534/698
[58] Field of Search ............. 534/602, 696, 697, 698

[56] References Cited

U.S. PATENT DOCUMENTS

| | | | |
|---|---|---|---|
| 2,809,962 | 10/1957 | Freyermuth et al. | 534/602 X |
| 2,933,488 | 4/1960 | Biedermann et al. | 534/602 X |
| 3,078,267 | 2/1963 | Armento | 534/602 X |
| 3,939,140 | 2/1976 | Meininger et al. | 534/602 |
| 4,005,065 | 1/1977 | Beffa et al. | 534/696 |
| 4,058,514 | 11/1977 | Uehlinger et al. | 534/698 |
| 4,933,437 | 6/1990 | Iff et al. | 534/602 |
| 4,997,917 | 3/1991 | Iff et al. | 534/602 |

FOREIGN PATENT DOCUMENTS

| | | |
|---|---|---|
| 0044937 | 2/1982 | European Pat. Off. |
| 0260557 | 3/1988 | European Pat. Off. |
| 0260562 | 3/1988 | European Pat. Off. |
| 0267385 | 5/1988 | European Pat. Off. |
| 967011 | 8/1964 | United Kingdom |

*Primary Examiner*—Robert W. Ramsuer
*Assistant Examiner*—Fiona T. Powers
*Attorney, Agent, or Firm*—Marla J. Mathias; Edward McC. Roberts

[57] ABSTRACT

A process is described for the preparation of pure, asymmetric 1:2 chromium complex dyes containing at least two groups which impart solubility in water, which process comprises reacting a mixture of two dyes of the formulae $$F_1\text{—}(SO_3H)_t \tag{1}$$

and $$F_2\text{—}SO_2\text{—}Y \tag{2}$$

in which the symbols are as defined in claim 1 with a chromium donor in a molar ratio of 0.85:1.0 to 1.2:1.0 in a one-pot process under pressure at a temperature above 100° C. and at a pH between 0 and 2 and then continuing the reaction at a slightly acid, neutral or slightly alkaline pH. The dyes obtained by the process according to the invention are suitable for dyeing, in particular, wool, silk, leather and synthetic polyamide fibres.

22 Claims, No Drawings

PREPARATION OF 1:2 CHROMIUM COMPLEXES ONE SULFO SUBSTITUTED AND ONE SULFONAMIDO OR THE LIKE SUBSTITUTED AZO DYES

The present invention relates to a process for the preparation of single-substance, asymmetric 1:2 metal complexes of azo and/or azomethine dyes in a one-pot process, each of the azo and azomethine dyes containing at least one group imparting solubility in water.

The present invention thus relates to a process for the preparation of asymmetric 1:2 chromium complex dyes which are at least 85% pure and particularly 90% pure and contain at least two groups which impart solubility in water, which process comprises reacting a mixture of two dyes of the formulae

  (1)

and

  (2)

in which $F_1$ and $F_2$ independently of one another are each the radical of a metallizable azo or azomethine dye, Y is amino, aryloxy or alkyl each of which is substituted or unsubstituted, and t is 1 or 2, in a molar ratio of 0.85:1.0 to 1.2:1.0 in a one-pot process with a chromium donor under pressure at a temperature above 100° C. and at a pH between 0 and 2, and then continuing the reaction at a slightly acid, neutral or slightly alkaline pH.

Preferred embodiments of the process according to the invention comprise a) selecting, as the temperature above 100° C., a temperature from 100° to 150° C., in particular 125° to 135° C.;

b) selecting, as the pH between 0 and 2, a pH of 0 to 1, in particular 0.3 to 0.7;

c) selecting, for the continuation of the reaction at a slightly acid, neutral or slightly alkaline pH, a temperature below 100° C., in particular 60° to 100° C. and preferably 90° to 95° C.;

d) selecting, as the slightly acid, neutral or slightly alkaline pH, a pH from 5 to 10, in particular 6 to 9;

e) using a mixture of two metallizable dyes differing in accordance with the definition in a molar ratio of 0.95:1.0 to 1.05:1.0, in particular in a ratio of 1:1;

f) chromium under a pressure of 1 to 5 bar (corresponding to 100,000 to 500,000 Pa), preferably 1 to 3 bar;

g) using an excess of 1 to 5 mol % of the chromium donor.

The reaction of the metal-free dyes with the chromium donor is preferably carried out in an aqueous medium in a closed apparatus under pressure.

Suitable chromium donors are chromium salts of inorganic or organic acids, for example chromium(III) fluoride, chromium(III) chloride and chromium(III) carbonate and especially chromium compounds of aliphatic or aromatic hydroxycarboxylic acids which contain the chromium in a complex linkage, for example lactic acid, citric acid, glycolic acid, tartaric acid and salicylic acid. If inorganic-chromium salts are used in the process according to the invention, the chroming is preferably carried out in the presence of catalytic amounts of auxiliary complex compounds, for example tartaric acid, lactic acid, citric acid or glycolic acid or, in particular, salicylic acid.

Chroming can, if desired, be carried out in the presence of suitable additives, for example salts of inorganic or organic acids, for example sodium acetate, carbonate or bicarbonate or potassium acetate, carbonate or bicarbonate.

Carrying out the process according to the invention comprises chroming the reaction mixture by adjusting the pH to a value between 0 and 2 by means of strong acids, preferably inorganic acids, for example sulfuric acid, heating the reaction mixture under pressure to a temperature above 100° C. and keeping it at this temperature for some time, in particular 2 to 10 hours and preferably 4 to 8 hours, then allowing the reaction mixture to cool to a temperature preferably below 100° C. and adjusting the pH to a slightly acid, neutral or slightly alkaline value by adding an alkali, for example sodium carbonate, and continuing the reaction for a short time, preferably 10 minutes to 3 hours and particularly 30 to 90 minutes. The asymmetric 1:2 chromium complex dye which is at least 85% pure can be isolated by methods known per se, for example salting out, filtering off and then drying.

The dyes obtained by the process according to the invention are either in the form of their free acid or, preferably, in the form of salts.

Examples of suitable salts are the alkali metal, alkaline earth metal or ammonium salts or the salts of an organic amine. The sodium, lithium, potassium or ammonium salts or the salt of triethanolamine may be mentioned as examples.

Other preferred embodiments of the process according to the invention are those in which a) the mixture of dyes used consists of two azo dyes and, accordingly, $F_1$ and $F_2$ independently of one another are each the radical of a metallizable azo dye;

b) the mixture of dyes used consists of an azo dye and an azomethine dye and, accordingly, one of the variables $F_1$ and $F_2$ is the radical of a metallizable azo dye and the other variable is a metallizable azomethine dye.

The metallizable azo dyes or azomethine dyes employed in the process according to the invention contain, as metallizable groups, especially hydroxyl and/or carboxyl groups.

If Y in the azo or azomethine dyes of the formula (2) is an amino radical which is substituted or unsubstituted, this can be an unsubstituted amino radical or an amino radical which is monosubstituted or disubstituted by, for example, alkyl, cycloalkyl, aralkyl and/or aryl.

A suitable alkyl substituent for the amino radical Y is, for example, a $C_1$–$C_4$alkyl radical, which is to be understood here and, in general, later in the text as meaning the methyl, ethyl, n-propyl, isopropyl or n-, iso-, sec- or tert-butyl radical. The $C_1$–$C_4$alkyl radical can be further substituted by, for example, $C_1$–$C_4$alkoxy or especially hydroxyl; examples are the 2-hydroxyethyl, 3-hydroxypropyl, 2-methoxyethyl and 2-ethoxyethyl radicals.

If the amino radical Y is substituted by cycloalkyl, the substituent is, for example, cyclopentyl, cycloheptyl and particularly cyclohexyl.

If the amino radical Y carries an aralkyl substituent, this is, for example, a $C_7$–$C_{12}$aralkyl substituent. Examples are benzyl, phenylethyl or o-, m- or p-xylyl.

An aryl substituent suitable for the amino radical Y is, for example, a phenyl radical which is unsubstituted or is further substituted by, for example, $C_1-C_4$alkyl, $C_1-C_4$alkoxy, halogen or nitro.

Here and, in general, later in the text $C_1-C_4$alkoxy is methoxy, ethoxy, n-propoxy, isopropoxy or n-, iso-, sec- or tert-butoxy, whereas halogen embraces the meanings iodine, bromine, fluorine and especially chlorine.

If Y is aryloxy it is, for example, phenoxy which is unsubstituted or substituted by, for example, $C_1-C_4$alkyl, $C_1-C_4$alkoxy, halogen or nitro.

If Y is an alkyl radical, this is, for example, a $C_1-C_4$alkyl radical and preferably the methyl or ethyl radical.

Y is preferably an amino radical which is unsubstituted or monosubstituted or disubstituted by $C_1-C_4$alkyl, $C_1-C_4$hydroxyalkyl, cyclohexyl, $C_7-C_{12}$aralkyl or phenyl which is unsubstituted or substituted by $C_1-C_4$alkyl, $C_1-C_4$alkoxy, halogen or nitro.

The radical Y is preferably a radical of the formula

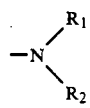  (3)

in which $R_1$ is hydrogen or $C_1-C_4$alkyl and $R_2$ is hydrogen, $C_1-C_4$alkyl, $C_1-C_4$hydroxyalkyl or phenyl which is unsubstituted or substituted by methyl, methoxy, chlorine or nitro.

In a particularly preferred embodiment of the process according to the invention an azo or azomethine dye wherein Y is the radical $-NH_2$ is used.

The metallizable azo dyes employed in the process according to the invention are preferably monoazo or disazo dyes containing diazo components and coupling components of the benzene, naphthalene or heterocyclic series.

It is preferable to use, in the process according to the invention, a mixture of azo dyes which, in the form of the free acid, have the formulae

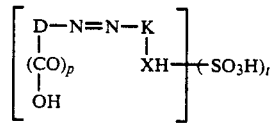  (1')

and

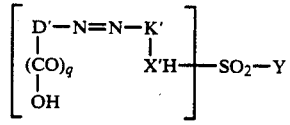  (2')

in which D and D' independently of one another are each the radical of a diazo component of the benzene or naphthalene series having a hydroxyl or carboxyl group in the o-position relative to the azo group, K and K' independently of one another are each the radical of a coupling component of the benzene or naphthalene series or of the heterocyclic series, the coupling component having the group —XH or —X'H in the o-position or α-position relative to the azo group, the groups —XH and —X'H independently of one another are —OH or —NHR in which R is hydrogen or $C_1-C_4$alkyl, p and q independently of one another are 0 or 1 and the meanings and preferences indicated previously apply to Y and t.

In the formulae (2) and (3) the radicals —XH and —X'H are preferably a hydroxyl group —OH in each case.

The diazo radicals D and D' are derived, for example, from a 1-naphthylamine or 2-naphthylamine or aminobenzene, and the said aromatic amines contain a hydroxyl or carboxyl group in the o-position relative to the amino group and can, in addition, be further substituted by one or more identical or different radicals.

Examples of suitable substituents on the phenyl or naphthyl radical D and D' are, in addition to $-SO_3H$ or $-SO_2-Y$, as follows: nitro, halogen, for example fluorine, chlorine and bromine, alkyl groups, in particular $C_1-C_4$alkyl groups, for example methyl, ethyl, n-propyl, isopropyl or n-, iso-, sec-, or tert-butyl, and alkoxy groups, in particular $C_1-C_4$alkoxy groups, for example methoxy, ethoxy, n-propoxy, isopropoxy or n-, iso-, sec-or tert-butoxy. p and q are in each case preferably the number 0.

D is preferably the radical of a 2-amino-1-naphthol or 1-amino-2-naphthol and especially the radical of a 2-aminophenol, it being possible for the said aromatic amines to be unsubstituted or to be further substituted by, for example, sulfo, nitro, chlorine, methyl or methoxy.

D' is preferably the radical of a 1-amino-2-naphthol or 2-amino-1-naphthol and especially the radical of a 2-aminophenol, which radical is in each case unsubstituted or further substituted by, for example, nitro, chlorine, methyl, methoxy or $-SO_2-Y$ in which Y has the meaning indicated above.

The following are examples of suitable diazo components on which the radicals D and D' can be based: 4-sulfamoyl-2-aminophenol, 5-sulfamoyl-2-aminophenol, 4-N,N-dimethylsulfamoyl-2-aminophenol, 5-N,N-dimethylsulfamoyl-2-aminophenol, 6-nitro-4-sulfo-2-aminophenol, 6-sulfo-4-nitro-2-aminophenol, 4-, 5- or 6-nitro-2-aminophenol, 4-chloro-2-aminophenol, 5-chloro-2-aminophenol, 4,6-dichloro-2-aminophenol, 4-chloro-5-nitro-2-aminophenol, 4-chloro-6-nitro-2-aminophenol, 4-nitro-6-chloro-2-aminophenol, 6-nitro-4-sulfamoyl-2-aminophenol, 1-amino-2-hydroxynaphthalene, 1-amino-2-hydroxynaphthalene-4-sulfonic acid, 6-nitro-1-amino-2-hydroxynaphthalene-4-sulfonic acid and 4-chloro-6-sulfo-2-aminophenol.

Examples of the coupling components on which the radicals K and K' are based are a phenol, resorcinol, 1-naphthol, 2-naphthol, 1-phenylpyrazol-5-one, 1-naphthylpyrazol-5-one, 6-hydroxy-3-cyanopyrid-2-one, 6-hydroxy-3-carbamoylpyrid-2-one, acetoacetanilide, benzoyl acetanilide, 4'-hydroxynaphtho-(2',1':4,5)-oxathiazole-S-dioxide or a 1-naphthylamine or 2-naphthylamine, it being possible for the said coupling components to be further substituted not only by $-SO_3H$ or $-SO_2-Y$, but also example, $C_1-C_4$alkyl, $C_1-C_4$alkoxy, nitro, halogen, hydroxyl, $C_2-C_4$alkanoylamino, for example acetylamino or propionylamino, benzoylamino, $C_2-C_4$alkoxycarbonylamino, for example methoxycarbonylamino or ethoxycarbonylamino, $C_1-C_2$alkylsulfonylamino and/or phenylamino which, in the phenyl moiety, is unsubstituted or substituted by methyl, methoxy or chlorine.

The radicals K and K' independently of one another are preferably derived from a 1-naphthol or 2-naphthol which is unsubstituted or substituted by methyl, chlorine, acetylamino, methylsulfonylamino, phenylamino, 2-,3- or 4-methylphenylamino, 2-, 3- or 4-methoxyphenylamino and/or, in particular, a radical $-SO_3H$ or —SO₂—Y, or from a 1-phenyl-3-methylpyrazol-5-one or acetoacetanilide in which the phenyl radical is in each case unsubstituted or substituted by, for example, $C_1$–$C_4$alkyl, $C_1$–$C_4$alkoxy, chlorine, nitro and/or sulfo or —SO₂—Y.

The following are examples of suitable coupling components on which the radicals K or K' can be based: 1-phenyl-3-methylpyrazol-5-one, 1-(2-, 3- or 4-methylphenyl)-3-methylpyrazol-5-one, 1-(2-, 3- or 4-sulfamoylphenyl)-3-methylpyrazol-5-one, 1-(2-, 3- or 4-sulfophenyl)-3-methylpyrazol-5-one, 1-(2-, 3- or 4-chlorophenyl)-3-methylpyrazol-5-one, acetoacetanilide, acetoacetanilide-3-sulfonic acid, acetoacetanilide-4-sulfonic acid, acetoacetanilide-3-sulfonamide, acetoacetanilide-4-sulfonamide, acetoacetanilide-3-N,N-dimethylsulfonamide, acetoacetanilide-4-N,N-dimethylsulfonamide, acetoaceto-2-, -3- or -4-methylanilide, 1-naphthol, 2-naphthol, 3-, 4- or 5-sulfamoyl-1-naphthol, 3-, 4- or 5-N,N-dimethylsulfamoyl-1-naphthol, 4'-hydroxynaphtho-(2',1':4,5)-oxathiazole-S-dioxide,5,8-dichloro-1-hydroxynaphthalene, 1-hydroxynaphthalene-4-, -5- or -8-sulfonic acid, 2-hydroxynaphthalene-4-, -5-, -6- or -7-sulfonic acid, 4-methyl-1-hydroxynaphthalene, 8acetylamino-2-hydroxynaphthalene, 6-phenylamino-1-hydroxynaphthalene-3-sulfonic acid, 6-(4-methoxyphenylamino)-1-hydroxynaphthalene-3-sulfonic acid, 8-methylsulfonylamino-2-hydroxynaphthalene, 1-hydroxynaphthalene-4-N,N-diethylsulfonamide, 1-hydroxynaphthalene-5-N,N-diethylsulfonamide, 1-hydroxynaphthalene-4-N-methylsulfonamide, 1-hydroxynaphthalene-5-N-methylsulfonamide, 1-hydroxy-3-, -4- or -5-hydroxyethylsulfonylnaphthalene, 1-hydroxy-4-N-hydroxyethylsulfonamide or 1-hydroxy-5-N-hydroxyethylsulfonamide.

A preferred embodiment of the process according to the invention comprises using a mixture of the azo dyes of the formulae (1') and (2') indicated above in which —K—XH and —K'—X'H independently of one another are each a radical of the formula

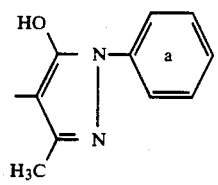

(6)

in which the phenyl radical (a) is unsubstituted or substituted by, for example, $C_1$–$C_4$alkyl, $C_1$–$C_4$alkoxy, nitro, halogen and/or, in the case of —K—XH, sulfo and, in the case of —K'—X'H, a radical —SO₂—Y; in this regard the phenyl radical (a) in formula (6) is preferably in each case unsubstituted or substituted by methyl, methoxy, chlorine and/or, in the case of —K—XH, sulfo and, in the case of —K'—X'H, sulfamoyl, N,N-dimethylsulfamoyl, N,N-diethylsulfamoyl, N-methylsulfamoyl, N-ethylsulfamoyl or methylsulfonyl.

Another preferred embodiment of the process according to the invention comprises using a mixture of the azo dyes of the formulae (1') and (2') indicated above in which —K—XH and —K'—X'H independently of one another are each a radical of the formula

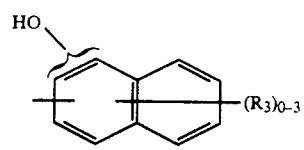

(7)

in which $R_3$ is 0 to 3 identical or different substituents selected from the group $C_1$–$C_4$alkyl, halogen, hydroxyl, $C_2$–$C_4$alkanoylamino, benzoylamino, $C_1$–$C_2$alkylsulfonylamino, phenylamino which is unsubstituted or is substituted in the phenyl moiety by methyl, methoxy or chlorine, and, in the case of —K—XH, sulfo and, in the case of —K'—X'H, the radical —SO₂Y; the naphthol radical of the formula (7) is in this regard preferably in each case unsubstituted or substituted by methyl, chlorine, acetylamino, methylsulfonylamino, phenylamino, 2-, 3- or 4-methylphenylamino, 2-, 3-or 4-methoxyphenylamino and/or, in the case of —K—XH, sulfo and, in the case of —K'—X'H, sulfamoyl, N,N-dimethylsulfamoyl, N,N-diethylsulfamoyl, N-methylsulfamoyl, N-ethylsulfamoyl, N-2-hydroxyethylsulfamoyl or methylsulfonyl.

A particularly preferred embodiment of the process according to the invention comprises using a mixture of the azo dyes which, in the form of the free acid, have the formulae

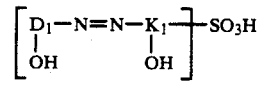

(1a)

and

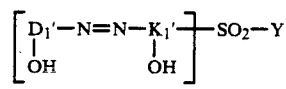

(2a)

in which $D_1$ and $D'_1$ independently of one another are the radical of a 2-aminophenol, 1-amino-2-naphthol or 2-amino-1-naphthol, it being possible for the said aromatic amines to be unsubstituted or to be further substituted by, for example, nitro, chlorine, methyl or methoxy, $K_1$ and $K'_1$ independently of one another are each a) a radical of the formula

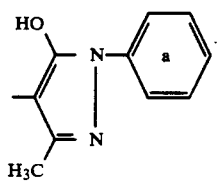

(6)

in which the phenyl radical (a) is unsubstituted or is substituted by $C_1$–$C_4$alkyl, $C_1$–$C_4$alkoxy, nitro or halogen, or b) a radical of the formula

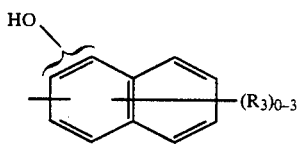

(7)

in which $R_3$ is 0 to 3 substituents selected from the group $C_1-C_4$alkyl, halogen, $C_2-C_4$alkanoylamino, benzoylamino, $C_1-C_2$alkylsulfonylamino or phenylamino which is unsubstituted or substituted by methyl, methoxy or chlorine, and the meanings and preferences indicated above apply to Y and the radical $D_1$ or $K_1$ carries the sulfo group and the radical $D'_1$ or $K'_1$ carries the $-SO_2-Y$ group.

Another variant of the process according to the invention consists in employing a mixture of starting dyes of the formulae

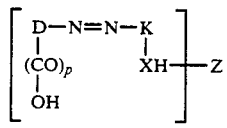

(4)

and

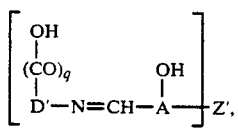

(5)

in which D, D', K, X, p and q are as defined above, one of the radicals Z and Z' is sulfo and the other is a group $-SO_2-Y$ in which Y is as defined above, and A is the radical of a 2-hydroxybenzaldehyde or 2-hydroxy-1-naphthaldehyde each of which is unsubstituted or substituted by, for example, $C_1-C_4$alkyl, $C_1-C_4$alkoxy, halogen or nitro.

It is also possible to use, in the process according to the invention, a mixture of a metallizable azo dye, an aromatic amine and an o-hydroxyaldehyde which meets the requirements mentioned above.

The azo and azomethine dyes employed in the process according to the invention are known or can be prepared by methods known per se.

Thus the diazotization of the diazo components known per se is effected, for example, in an aqueous or aqueous-organic medium, preferably at low temperatures, for example at $-5°$ to 30° C., by the action of nitrites, for example alkali metal nitrites, in particular sodium nitrite, in an aqueous mineral acid solution. The coupling of the diazo components diazotized in this manner with the coupling components known per se is also preferably effected at low temperatures, for example at 0° to 30° C., and at an acid, neutral or alkaline pH.

The azomethine dyes are prepared by subjecting aromatic amines to a condensation reaction in a known manner with, for example, o-hydroxybenzaldehydes or o-hydroxynaphthaldehydes.

Another embodiment of the process according to the invention comprises pretreating, before the chroming at pH 0 to 2, a mixture of the metallizable starting dyes defined earlier in the text with a chromium donor at pH 3 to 4 in a molar ratio of 0.85:1.0 to 1.2:1.0 in a one-pot process, and then continuing the reaction as described above, i.e. under pressure at a temperature above 100° C. and at a pH between 0 and 2 and then at a slightly acid, neutral or slightly alkaline pH.

It is an advantage of the pretreatment described in the process according to the invention that, particularly in the case of starting dyes which can only be reacted very slowly with a chromium donor at a pH of 0 to 2, a shortening of the reaction time is achieved by means of the pretreatment at pH 3 to 4.

The asymmetric 1:2 chromium complex dyes obtained by the process according to the invention are distinguished by a high purity of product such as has hitherto only been known in the case of complexes prepared by the addition method.

1:2 Chromium complexes having a purity of over 85% are obtained by the process according to the invention particularly at a 1:1 molar ratio between the participants in the mixture. Deviations from the 1:1 molar ratio between the participants in the mixture are used to adjust the shade as desired.

The asymmetric 1:2 chromium complex azo dyes or 1:2 chromium complex azomethine dyes obtained by the process according to the invention are suitable for dyeing and printing a very wide range of materials, but, in particular, for dyeing animal materials, such as silk, wool and especially leather, and also for dyeing and printing synthetic fibres composed of high molecular weight polyamides, high molecular weight polyurethanes or polyacrylonitrile. They are particularly suitable for dyeing from a slightly alkaline, neutral or slightly acid bath, preferably an acetic acid bath. The dyeings thus obtained are level and have good overall fastness properties, in particular good fastness to light and wet processing.

In the following examples parts are parts by weight. The temperatures are in degrees centigrade. The relationship between parts by weight and parts by volume is the same as that between grams and cubic centimeters.

EXAMPLE 1

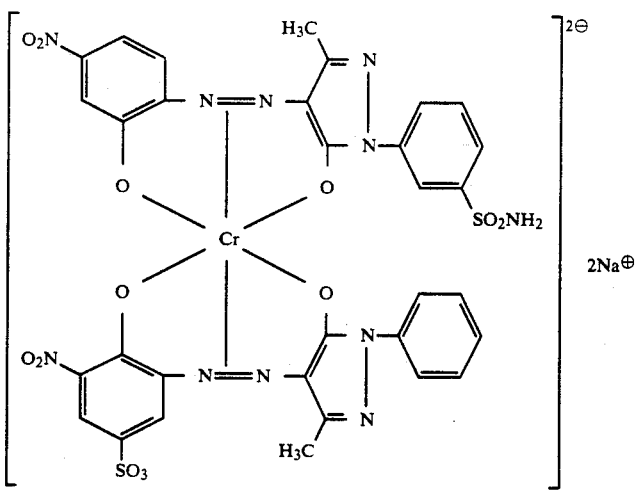

10.5 parts of the azo dye 6-nitro-4-sulfo-2-aminophenol→1-phenyl-3-methylpyrazol-5-one and 10.5 parts of the azo dye 5-nitro-2-aminophenol→1-(3'-sulfamoylphenyl)-3-methylpyrazol-5-one are suspended in 200 parts of water, 0.5 part of salicylic acid is added and the pH of the mixture is adjusted to a value of approx. 0.8 with 50% $H_2SO_4$. After 4.2 parts of chromium(III) sulfate have been added, the mixture is heated in an autoclave to approx. 130° C., in the course of which an internal pressure of approx. 1.8–2.0 bar is set up, and is kept at this temperature for 6 hours. The mixture is then cooled and its pH is adjusted to 9 with 30% sodium hydroxide solution. The solution is stirred for a further 1 to 2 hours at 90° to 95° C. and is then evaporated to dryness. The resulting dye consists of 90% of the pure asymmetric complex. The dye dyes leather in a red shade which has good overall fastness properties.

EXAMPLE 2

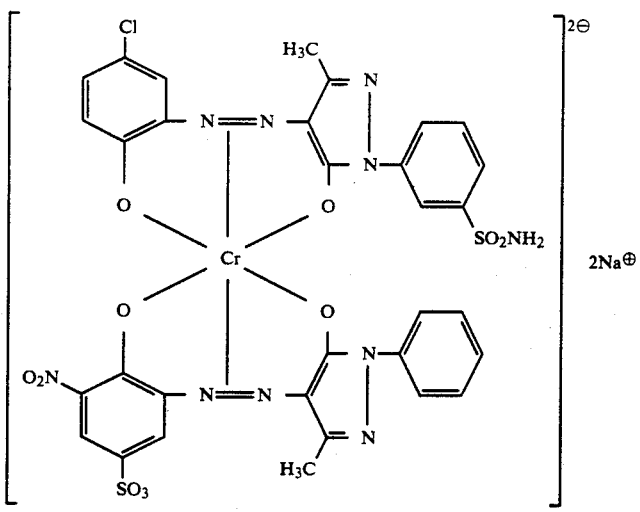

10.5 parts of the azo dye 6-nitro-4-sulfo-2-aminophenol→1-phenyl-3-methylpyrazol-5-one and 10.2 parts of the azo dye 4-chloro-2-aminophenol→1-(3'-sulfamoylphenyl)-3-methylpyrazol-5-one are suspended in 200 parts of water, 0.5 part of salicylic acid is added and the pH of the mixture is adjusted to a value of approx. 0.8 with 50% $H_2SO_4$. After 4.2 parts of chromium(III) sulfate have been added, the mixture is heated in an autoclave to approx. 130° C., in the course of which an internal pressure of approx. 1.8–2.0 bar is set up, and is kept at this temperature for 6 hours. The mixture is then cooled and its pH is adjusted to a value of 8.5–9 with 30% sodium hydroxide solution. The solution is stirred for about 2 hours more at 90° to 95° C. and is then evaporated to dryness. The dye obtained after drying in vacuo consists of 95% of the pure asymmetric complex. The dye dyes wool and also leather in a red shade which has good overall fastness properties.

EXAMPLE 3

The procedure of Example 2 is repeated, except that the azo dye formed from diazotized 4-nitro-2-aminophenol-6-sulfonic acid and 1-phenyl-3-methylpyrazol-5-one is used instead of the azo compound mentioned in the first reference, affording an analogous asymmetric 1:2 metal complex dye which dyes wool and leather in a yellowish-tinged orange shade which has comparable overall fastness properties.

EXAMPLE 4

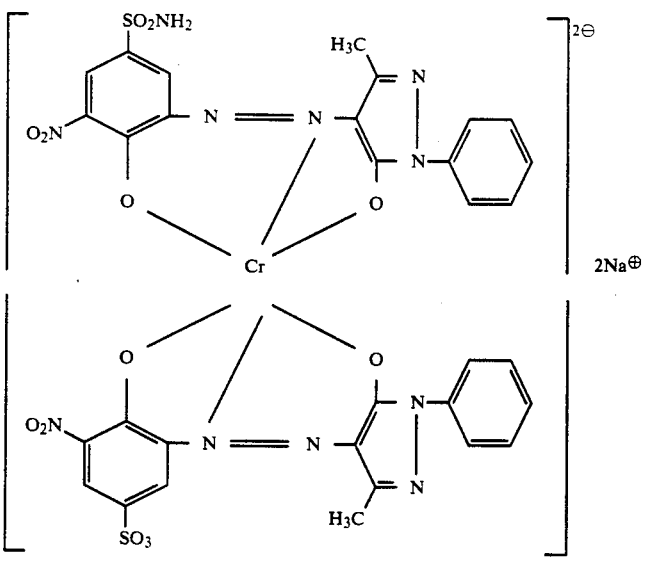

10.47 parts of the azo dye formed from diazotized 6-nitro-2-aminophenol-4-sulfonic acid and 1-phenyl-3-methylpyrazol-5-one and 10.45 parts of the azo dye formed from diazotized 6-nitro-2-aminophenol-4-sulfonamide and 1-phenyl-3-methylpyrazol-5-one are suspended in 200 parts of water, with the addition of 0.5 part of salicylic acid. The pH of the mixture is adjusted to a value of 0.6–0.8 with 50% sulfuric acid, 4.15 parts of chromium sulfate are added and the mixture is then heated at 130°–135° C. in an autoclave for 8 hours, in the course of which an internal pressure of 2 bar is set up. After the reaction mass has been cooled to approx. 90° C., the pH is adjusted to a value of 8.5–9.0 by adding 30% sodium hydroxide solution, and a clear, red solution is formed. After being stirred for 2 hours at 90°–95° C., the dye is isolated by concentration to dryness in vacuo. Scarlet-red dyeings which have good overall fastness properties are obtained by means of the dye on wool or leather.

EXAMPLE 5

20.95 parts of the azo dye formed from diazotized 4-nitro-2-aminophenol and 1-(4'-sulfophenyl)-3-methylpyrazol-5-one and 20.9 parts of the azo dye formed from diazotized 6-nitro-2-aminophenol-4-sulfonamide and 1-phenyl-3-methylpyrazol-5-one are introduced into 400 parts of water with stirring and with the addition of 0.75 part of salicylic acid; the pH of the suspension is adjusted to 0.6 by adding 50% sulfuric acid, and 8.25 parts of chromium sulfate are added. The reaction mixture is then kept at a temperature of 130°–135° C. and an internal pressure of 2 bar for 6 hours in an autoclave. After the chroming suspension has been cooled to approx. 90° C. its pH is adjusted to a value of 8.5–9.0 with 30% sodium hydroxide solution, and stirring is then continued for 2 hours at 90° C. The dye is present in the form of a clear, red solution and is isolated by concentration to dryness. Full, orange-red dyeings are obtained on leather.

EXAMPLE 6

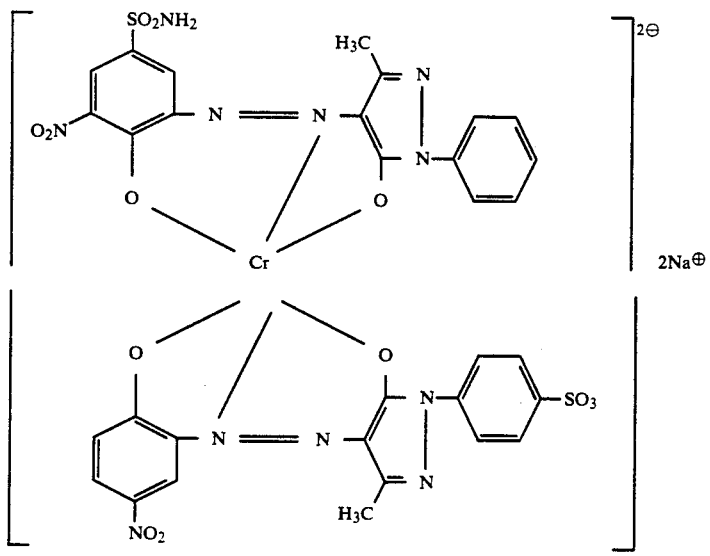

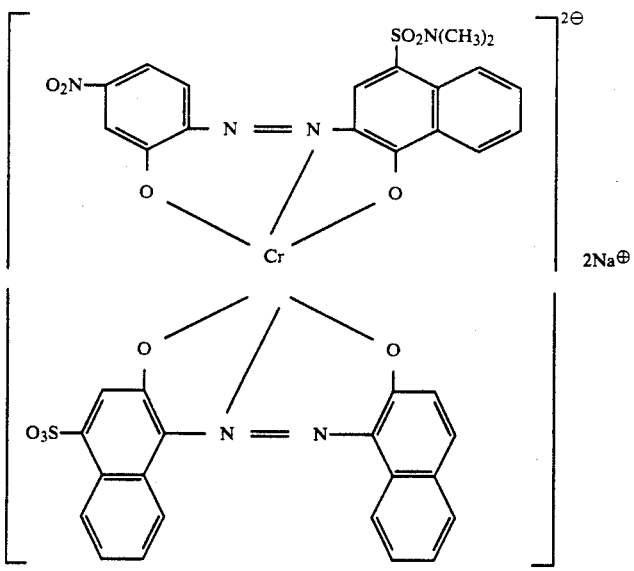

21.95 parts of the azo dye formed from diazotized 1-amino-2-hydroxynaphthalene-4-sulfonic acid and 2-hydroxynaphthalene are suspended, together with 20.8 parts of the azo dye formed from diazotized 5-nitro-2-aminophenol and 1-hydroxynaphthalene-4-sulfonic acid N,N-dimethylamide, in 400 parts of water with stirring and with the addition of 0.5 part of salicylic acid. After 50% sulfuric acid has been added to reach a pH of 0.6, 8.25 parts of chromium sulfate are added. The reaction mixture is then stirred in an autoclave for 8 hours at an internal temperature of 135° C. and an internal pressure of 2.1 bar. After the resulting suspension has been cooled to approx. 90° C. its pH is adjusted to a value of 8.5–9.0 with 30% sodium hydroxide, and stirring is is continued for 2 hours at 90°–95° C. The asymmetric 1:2 chromium complex is isolated from the resulting clear solution by concentration to dryness in vacuo. The dye, which is readily soluble in water, dyes wool, polyamide fibres or leather in full, reddish-tinged navy blue shades which have good overall fastness properties.

EXAMPLE 7

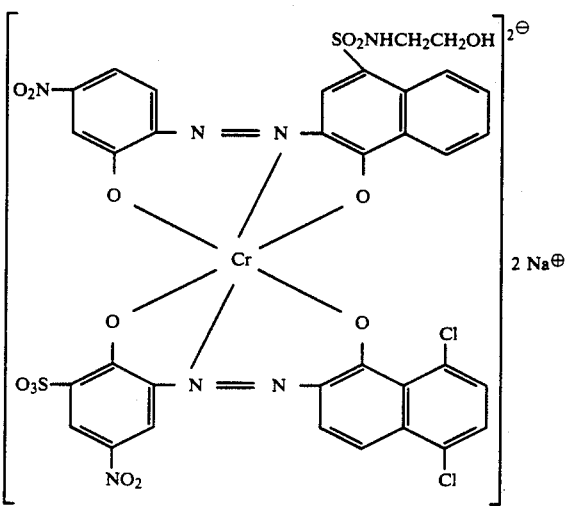

22.9 parts of the azo dye formed from diazotized 4-nitro-2-aminophenol-6-sulfonic acid and 5,8-dichloro-1-hydroxynaphthalene and 21.6 parts of the azo dye formed from diazotized 5-nitro-2-aminophenol and 1-hydroxynaphthalene-4-(2'-hydroxyethyl)-sulfonamide are suspended in 500 parts of water with the addition of 0.5 part of salicylic acid. The pH of the suspension is adjusted to a value of 0.6 by adding 50% sulfuric acid, 8.25 parts of chromium sulfate are added and the mixture is then stirred in an autoclave for 8 hours at an internal temperature of 135° C. After the reaction mass has been cooled to 90° C., its pH is adjusted to a value of 8.5–9.0 with 30% sodium hydroxide solution, and stirring is continued for 2 hours at 90°–95° C. The asymmetric 1:2 complex is precipitated from the resulting deep blue solution by adding sodium chloride, and is isolated by filtration, washed with dilute sodium chloride solution and dried in vacuo at 80° C. The resulting dye produces fast dyeings dark blue on wool, synthetic polyamide material or leather.

Dyeing Instructions for Wool 100 parts of woolen knitting yarn are introduced at 50° C. into a dyebath containing 2 parts of the dyes of Example 1, 4 parts of ammonium sulfate and 2 parts of a levelling assistant in 4000 parts of water. The liquor is brought to the boil in the course of 45 minutes and is kept at this temperature for a further 45 minutes. The yarn, which has been dyed red, is then taken out, rinsed thoroughly with cold water and dried.

Dyeing Instructions for Leather 100 parts of velour garmet leather (dry weight) are fulled for 2 hours at 50° C. in a solution of 1000 parts of water and 2 parts of 24% ammonia, and are then dyed for 1 hour at 60° C. in a solution of 1000 parts of water, 2 parts of 24% ammonia and 6 parts of the dyes of Example 1. A solution of 40 parts of water and 4 parts of 85% formic acid is then added and dyeing is continued for a further 30 minutes. The leather articles are then rinsed thoroughly and, if appropriate, also treated with 2 parts of a dicyandiamide/formaldehyde condensation product for 30 minutes at 50° C. Other types of velour leather and also glove leather can be dyed in the same manner. The red dyeings thus obtained are distinguished by good fastness properties and by a good hiding power.

Dyeing Instructions for Polyamide 100 parts of a fabric composed of texturized polyamide (nylon 6, 6) are introduced at 40° to 50° C. into a dyebath containing 2 parts of the dye mentioned in Example 1, 1.5 parts of a levelling agent based on an ethoxylation product and 4 parts of ammonium acetate in 4000 parts of water. The pH of the dyebath is adjusted to a value of 4.5 with 80% acetic acid.

The dyebath is heated to the boil in the course of 45 minutes and is kept at this temperature for a further 60 minutes. The polyamide fabric, which is removed after being cooled to 80° C. and rinsed and dried, is dyed in a red shade.

What is claimed is:

1. A process for the preparation of asymetric 1:2 chronium complex dyes which are at least 85% pure and contain at least two groups which impart solubility in water, which process comprises reacting a mixture of two dyes of the formulae

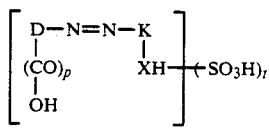
(1')

and

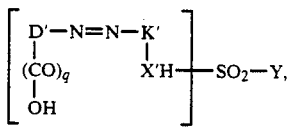
(2')

in which D and D' independently of one another are each a diazo component benzene or naphthalene radical containing a hydroxyl or carboxyl group in the o-position relative to the azo group, K—XH and K'—X'H independently of one another are each a) a radical of the formula

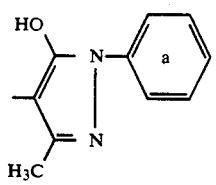
(6)

in which the phenyl radical (a) is unsubstituted or is substituted by $C_1$–$C_4$alkyl, $C_1$–$C_4$alkoxy, nitro or halogen, or b) a radical of the formula

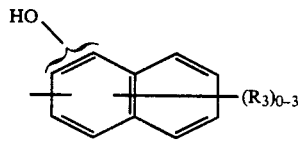
(7)

in which the group —OH is in the o-position relative to the azo group and $R_3$ is 0 to 3 substituents selected from the group $C_1$–$C_4$alkyl, halogen, $C_2$–$C_4$alkanoylamino, benzoylamino, $C_1$–$C_2$alkyl-sulfonylamino or phenylamino which is unsubstituted or substituted by methyl, methoxy or chlorine, Y is amino which is unsubstituted or mono-substituted or disubstituted by $C_1$–$C_4$alkyl, $C_1$–$C_4$hydroxyalkyl, cyclohexyl, $C_7$–$C_{12}$aralkyl and/or phenyl which is unsubstituted or substituted by $C_1$–$C_4$alkyl, $C_1$–$C_4$alkoxy, halogen or nitro, or is phenoxy which is unsubstituted or substituted by $C_1$–$C_4$alkyl, $C_1$–$C_4$alkoxy, halogen or nitro, or is $C_1$–$C_4$alkyl, t is 1 or 2, p and q independently of one another being 0 or 1, and the radical D or K carries the sulfo group(s) and the radical D' or K' carries the —$SO_2$—Y group, in a molar ratio of 0.85:1.0 to 1.2:1.0 in a one-pot process with a chronium donor under pressure at a temperature above 100° C. and at a pH between 0 and 2, and then continuing the reaction at a slightly acid, neutral or slightly alkaline pH.

2. A process according to claim 1, wherein a temperature of 100° to 150° C. is selected as the temperature above 100° C.

3. A process according to claim 1, wherein a pH of 0 to 1 is selected as the pH between 0 and 2.

4. A process according to claim 1, wherein a temperature below 100° C. is selected for the continuation of the reaction at a slightly acid, neutral or slightly alkaline pH.

5. A process according to claim 4, wherein a pH of 5 to 10 is selected as the slightly acid, neutral or slightly alkaline pH.

6. A process according to claim 1, wherein a mixture of two metallizable starting dyes in a molar ratio of 0.95:1.0 to 1.05:1.0 is used.

7. A process according to claim 1, wherein chroming is carried out under a pressure of 1 to 5 bar.

8. A process according to claim 1, wherein an excess of 1 to 5 mol % of chromium donor is used.

9. A process according to claim 1, wherein the reaction of the metal-free starting dyes with the chromium donor is carried out in an aqueous medium.

10. A process according to claim 1, wherein the chroming is carried out in the presence of catalytic amounts of auxiliary complex compounds selected from the group consisting of tartaric acid, lactic acid, citric acid, glycolic acid and salicylic acid.

11. A process according to claim 1, wherein, before the chroming at pH 0 to 2, the metallizable starting dyes defined are pretreated at pH 3 to 4 with a chromium donor in a one-pot process.

12. A process according to claim 1, wherein Y is a radical of the formula

(3)

in which $R_1$ is hydrogen or $C_1$–$C_4$alkyl and $R_2$ is hydrogen, $C_1$–$C_4$alkyl, $C_1$–$C_4$hydroxyalkyl or phenyl which is unsubstituted or substituted by methoxy, methyl, chlorine or nitro.

13. A process according to claim 1, wherein Y is the radical —$NH_2$.

14. A process according to claim 1, in which D and D' independently of one another are the radical of a 2-aminophenol, 1-amino-2-naphthol or 2-amino-1-naphthol, it being possible for the said aromatic amines to be unsubstituted or to be further substituted by nitro, chlorine, methyl or methoxy, Y is a radical of the formula

 (3)

in which $R_1$ is hydrogen or $C_1$–$C_4$alkyl and $R_2$ is hydrogen, $C_1$–$C_4$alkyl, $C_1$–$C_4$hydroxyalkyl or phenyl which is unsubstituted or substituted by methoxy, methyl, chlorine or nitro, t is 1 and p and q are each 0.

15. A process of claim 1 wherein the asymmetric 1:2 chronium complex dyes are at least 90% pure.

16. A process of claim 2 wherein the temperature above 100° C. is from 125° to 135° C.

17. A process of claim 3 wherein the pH between 0 and 2 is from 0.3 to 0.7.

18. A process of claim 4 wherein a temperature of from 60° to 100° C. is selected for the continuation of the reaction.

19. A process of claim 18 wherein a temperature of from 90° to 95° C. is selected for the continuation of the reaction.

20. A process of claim 5 wherein a pH of from 6 to 9 is selected as the slightly acid, neutral or slightly alkaline pH.

21. A process of claim 6 wherein the molar ratio is 1:1.

22. A process of claim 7 wherein the pressure is from 1 to 3 bar.

* * * * *